US012658335B2

(12) United States Patent
Castillo et al.

(10) Patent No.: US 12,658,335 B2
(45) Date of Patent: Jun. 16, 2026

(54) SYSTEMS FOR RADIOISOTOPE GENERATION AND METHODS OF PREPARATION AND ADMINISTRATION

(71) Applicant: Jubilant Draximage Inc., Montreal (CA)

(72) Inventors: Abmel Xiques Castillo, Montreal (CA); Vijayaraj Kuniyil Kulangara, Montreal (CA); Indranil Nandi, Yardley, PA (US)

(73) Assignee: Jubilant Draximage Inc. (CA)

( * ) Notice: Subject to any disclaimer, the term of this patent is extended or adjusted under 35 U.S.C. 154(b) by 462 days.

(21) Appl. No.: 18/466,748

(22) Filed: Sep. 13, 2023

(65) Prior Publication Data

US 2024/0249856 A1 Jul. 25, 2024

Related U.S. Application Data

(60) Provisional application No. 63/480,949, filed on Jan. 20, 2023.

(51) Int. Cl.

| | |
|---|---|
| ***G21G 4/08*** | (2006.01) |
| ***G21F 5/015*** | (2006.01) |
| ***G21G 1/00*** | (2006.01) |

(52) U.S. Cl.

CPC ............... *G21G 4/08* (2013.01); *G21F 5/015* (2013.01); *G21G 1/0005* (2013.01)

(58) Field of Classification Search

None

See application file for complete search history.

(56) References Cited

U.S. PATENT DOCUMENTS

2007/0158271 A1* 7/2007 Tartaglia .............. G21G 1/0005 210/259

FOREIGN PATENT DOCUMENTS

| | | | | | |
|---|---|---|---|---|---|
| AU | 2006345883 | A1 * | 1/2008 | ............. B01D 15/10 |
| CA | 2631712 | A1 * | 1/2008 | ............. B01D 15/10 |
| CA | 2631712 | C * | 4/2014 | ........... G21G 1/0005 |
| CN | 102971800 | B * | 6/2016 | ........... G21G 1/0005 |
| CS | 255601 | B1 * | 3/1988 | ............... G21G 4/08 |
| EP | 2492920 | A2 * | 8/2012 | ............ B01J 20/284 |
| PT | 1493161 | E * | 4/2011 | ............... G21G 4/08 |

* cited by examiner

*Primary Examiner* — Andrew Smyth

(74) *Attorney, Agent, or Firm* — William D. Hare; McNeely, Hare & War, LLP

(57) ABSTRACT

The present invention provides a radioisotope generator system with enhanced safety features and implements such system. In particular, the present invention provides a radioisotope generator system comprising a surface that comprises three ports: an evacuation port, a loading port, and a saline flush port. The saline flush port is permanently connected with the loading port so that the rinsing solution can be placed on the saline port and pass it through the Mo-99 vial to minimize the wastage of the Mo-99. The present invention provides a robust design of the three-port radioisotope generator, which is cost-effective and ensures improved safety from needle contamination.

18 Claims, 3 Drawing Sheets

SYSTEMS FOR RADIOISOTOPE GENERATION AND METHODS OF PREPARATION AND ADMINISTRATION

TECHNICAL FIELD OF THE INVENTION

The invention relates to a radioisotope generator system and method of producing radioisotopes. In particular, the invention relates to improved systems and methods for producing customized, predictable and reproducible supplies of radioisotopes for use in nuclear medicine procedures with optimum efficiency and enhanced safety.

BACKGROUND OF THE INVENTION

Nuclear medicine is a branch of medicine dealing with the use of radioisotopes as radiopharmaceuticals or radioactive tracers in the diagnosis and treatment of disease. Radioisotopes are the unstable forms of a chemical element that emit radiation as it breaks down and transform into a more stable form. They can be defined as atoms that contain an unstable combination of neutrons and protons, or excess energy in their nucleus. Atoms with unstable nuclei regain stability by decaying excess particles and energy in the form of radiation and this process is called as radioactive decay. The radioactive decay process is measured with a time period known as the half-life. The unstable radioisotopes are known as parent radioisotopes and the more stable radioisotope form is known as the daughter radioisotope.

Radiations can produce changes in a substance and are easily traceable or detectable. Thus, the use of radioisotopes has tremendously increased in recent time in the nuclear medicines and radiopharmaceuticals field. Radioisotopes are natural or artificially created isotopes of a chemical element that has an unstable nucleus that decays and emits alpha, beta, or gamma rays until stability is reached. Since radioisotopes have very short half-lives, they are prepared in radioisotope generators and infused into patients immediately after the elution completes. However, there is always a possibility of contamination which can cause undesirable and harmful side effects inside the patient's body after administration.

Producing high-quality radioisotopes requires expertise and specialized facilities with the application of good manufacturing practices and the use of standard protocols with high-quality control parameters. Daily quality control (DQC) testing ensures the radioactive purity of the daughter radioisotopes and also ensures that there are no undesired impurities such as parent radioisotopes with long half-lives. Considering the existing challenges related to contaminated eluate, the United States Food and Drug Administration (US FDA) has issued guidelines to ensure the basic standard for drug strength, quality, and purity of the daughter radioisotope to be injected or infused into the patient's body.

Technetium-99m (Tc-99m) is used in medical tests as a radioactive tracer that can be detected in the body by medical equipment. A variety of different radiopharmaceuticals based on Tc-99m are used for imaging and functional studies of the brain, myocardium, thyroid, lungs, liver, gallbladder, kidneys, skeleton, blood, and tumors. Other generator-derived radioisotopes that are used as tracers include yttrium-90, rhenium-188, and gallium-68. Researchers continue to find new uses for radioisotopes, such as Tc-99m. For example, Tc-99m was used to precisely diagnose the infected lymph nodes in breast cancer patients by injecting Tc-99m into the breast around the tumor to allow them to locate the node quickly and precisely before ever making an incision.

A Tc-99m generator is a device used to extract Tc-99m from decaying molybdenum-99 ("Mo-99"). The Mo-99 is adsorbed on an alumina column which is arranged so that the sterile saline solution can be fed through the column to wash out, or elute, only the daughter radioisotope, Tc-99m. The parent, Mo-99 has a longer half-life (66 hours) than the daughter Tc-99m (6 hours), and the parent continuously decays to form the daughter's radioisotope, which is eluted when needed. Tc-99m emits readily detectable gamma rays. The generator is usually eluted, or "milked," every 24 hours and replaced with a new generator once a week because the parent radioisotope has decayed below useful levels and can be eluted with the daughter radioisotope to the final eluate and may have a chance of getting contaminated infusion to patients. Most commercial generators use column chromatography, in which Mo-99 is adsorbed on alumina. Normal saline solution can be run through a column of immobilized Mo-99 to elute soluble Tc-99m, resulting in a saline solution containing the Tc-99m.

Typically, commercial radio pharmacies replace their generators on a bi-weekly basis as the useful life of a Tc-99m generator is approximately two weeks or equal to about 5 half-lives of the Mo-99 parent isotope. Hence, typical clinical nuclear medicine units purchase at least one such generator every two weeks or order several in a staggered fashion. The lead-lined generators are heavy and bulky and represent significant manipulation and toil for personnel to replace and dispose of disbursed generators. Large quantities of lead, molded plastic containers, and packing materials are used only once and discarded after two weeks. Shipping costs and waste are real considerations for end-users. Further, conventional generator systems lack flexibility as they are limited to fixed activity denominations per unit sold, resulting in limited predictability and reproducibility. Typical generators also do not provide activity above 19 Ci.

U.S. Pat. No. 7,700,926 discloses systems and methods for radioisotope generation. The disclosed systems have high activity levels and do not require weekly replacement, handling, and transport of heavy shielding materials associated with conventional generators. However, the said patent fails to disclose a generator system and process without any contamination. The present invention provides an improved radioisotope generator system. The system disclosed in the present invention eliminates regulatory and radiation safety concerns regarding a contaminated saline entry port. The generator system as per the present invention ensures normal operation and functioning during the entire operation.

SUMMARY OF THE INVENTION

The present invention aims to provide a radioisotope generator system with enhanced safety features and a process for producing and implementing such system.

It is the object of the present invention to provide an improved generator system and method of producing customized, predictable and reproducible supplies of radioisotopes for use in nuclear medicine with optimum efficiency and safety.

It is an object of the present invention to provide systems and methods for producing customized, predictable and reproducible supplies of radioisotopes having high activity levels that do not require weekly replacement, handling, or transport of heavy shielding materials associated with conventional generators and a robustly designed radioisotope generator, which can eliminate the needle contaminations.

It is an object of the present invention to provide a three-ports design system having a surface that comprises an evacuation port, a loading port, and a saline flush port.

It is an object of the present invention to provide a three-ports design system of a radioisotope generator, comprising a generator column housing that is fabricated from radioactivity shielding material convenient to use in radio pharmacy.

It is another object of the present invention to provide a system containing a three-ports design having a surface that comprises an evacuation port, a loading port, and a saline flush port; wherein, the saline flush port is permanently connected with the loading port so that where the rinsing solution can be placed on the saline port and pass it through the Mo-99 vial to recover almost 100% of the activity intended for loading. The system and method as per the present invention provides a robust design of the three-ports radioisotope generator, which is cost-effective, minimizes the waste of the Mo-99, and also provides safety from needle contamination.

BRIEF SUMMARY OF DRAWINGS

Further features and advantages of the present invention will become apparent from the following detailed description, taken in combination with the appended drawings, in which.

DETAILED DESCRIPTION

Figure 1:
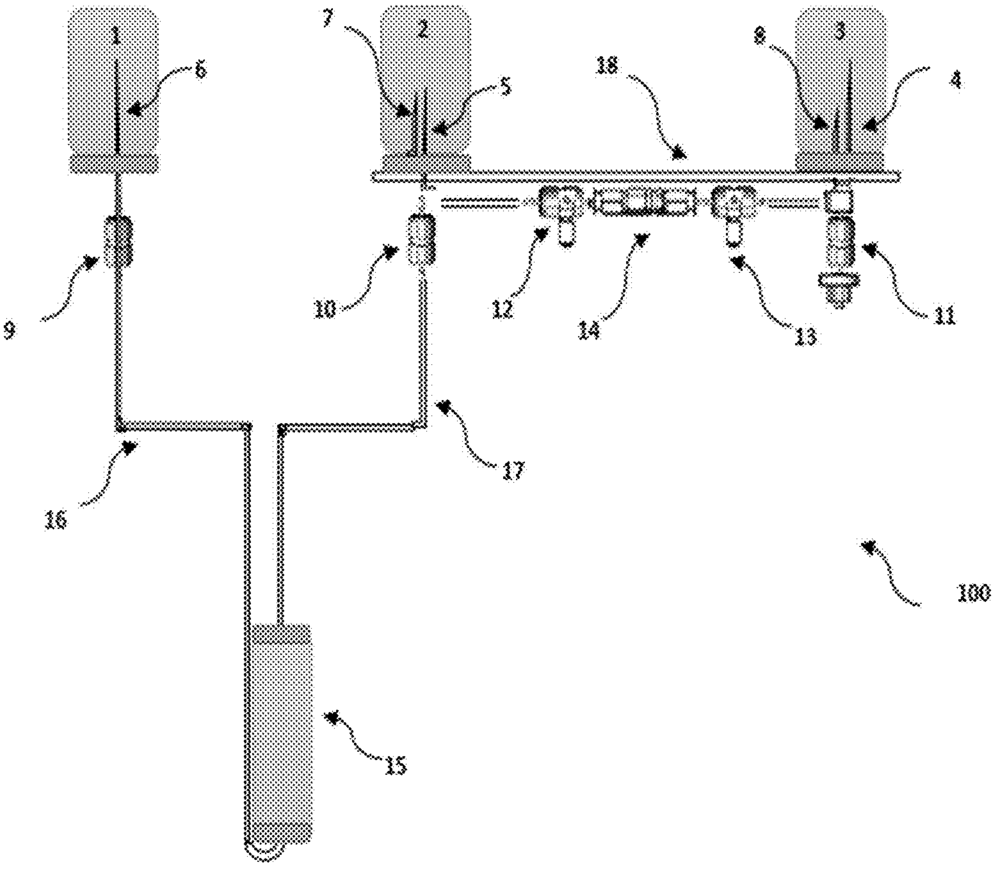
FIG. 1 Depicts the diagram of $^{99}Mo/^{99m}Tc$ radioisotope generator.

The present disclosure provides a radioisotope generator system with enhanced safety features and a process for producing and implementing such system.

The radioisotope generator system as per the present invention provides customized, predictable, and reproducible supplies of radioisotopes for use in nuclear medicine with optimum efficiency and safety.

The present invention provides a three-port design system for a generator column housing which is fabricated from the radioactive shielded material. The three-port design has a surface that comprises an evacuation port, a loading port, and a saline flush port. The evacuation port is used for evacuating the generated radionuclide, the loading port is used for re-loading the parent radionuclide into the generator column and the saline flush port is used for providing the eluent. The saline flush port is permanently connected with the loading port so that the rinsing solution can be placed on the saline port and pass it through the Mo-99 vial to recover almost 100% of the activity intended for loading. This robust design of the three-port radioisotope generator as per the present invention ensures safety from needle contamination.

The present invention can be more readily understood by reading the following detailed description of the invention and included embodiments.

As used herein, the term "imaging" refers to techniques and processes used to create images of various parts of the human body for diagnostic and treatment purposes within digital health using one or more of X-ray radiography, Fluoroscopy, Magnetic resonance imaging (MRI), Computed Tomography (CT), Medical Ultrasonography or Ultrasound Endoscopy Elastography, Tactile imaging, Thermography Medical photography, and nuclear medicine functional imaging techniques e.g. Positron Emission Tomography (PET), Dynamic Positron Emission Tomography or Single-photon Emission Computed Tomography (SPECT). Imaging seeks to reveal internal structures of the body, as well as to diagnose and treat disease.

As used herein, the term "Positron Emission Tomography" (PET) refers to a functional imaging technique that uses radioactive substances known as radiotracers or radionuclides to visualize and measure changes in metabolic processes, and in other physiological activities including blood flow, regional chemical composition, and absorption. Different tracers can be used for various imaging purposes, depending on the target process within the body commonly used radionuclide isotopes for PET imaging include Rb-82 (Rubidium-82), O-15 (Oxygen-15), F-18 (Fluorine-18), Ga-68 (Gallium-68), Cu-61 (Copper-61), Cu-64 (Copper-64), C-11 (Carbon-11), N-13 (Ammonia-13), Co-55 (Cobalt-55) and Zr-89 (Zirconium-89).

As used herein, the term "SPECT" refers to a single-photon emission computed tomography, a nuclear medicine tomographic imaging technique using gamma rays and providing true 3D information. This information is typically presented as cross-sectional slices through the patient but can be freely reformatted or manipulated as required. The technique requires the delivery of a gamma-emitting radioisotope (a radionuclide) into the patient, normally through injection into the bloodstream. A marker radioisotope is generally attached to a specific ligand to create a radioligand; whose properties bind it to certain types of tissues. This allows the combination of ligand and radiopharmaceutical to be carried and bound to a region of interest in the body, where the ligand concentration is assessed by a gamma camera. SPECT agents include, but are not limited to, $^{99m}Tc$ technetium-99m ($^{99m}Tc$)-Sestamibi, $^{99m}Tc$ Technetium-99m DMSA, $^{99m}Tc$ Technetium-99m Sulphur colloid, $^{99m}Tc$ Technetium-99m Mertiatide, $^{99m}Tc$ Technetium-99m MDP, $^{99m}Tc$ Technetium-99m Gluceptate. $^{99m}Tc$ Technetium-99m dl-HMPAO, $^{99m}Tc$ Technetium-99m DTPA, $^{99m}Tc$ Technetium-99m MAA and $^{99m}Tc$-Tetrofosmin.

As used herein, the term "Computed Tomography" (CT) refers to computerized x-ray imaging in which a beam of x-rays is aimed at a patient and rotated around the body producing signals that are processed by the machine's computer to generate cross-sectional images of the body. These slices are called as tomographic images and contain more detailed information than conventional x-rays. Once the machine's computer collects a number of successive slices, they can be digitally "stacked" together to form a three-dimensional image of the patient that allows easier identification and location of basic structures as well as possible tumors or abnormalities.

As used herein, the term "Magnetic Resonance Imaging" (MRI) is a non-invasive imaging technology that produces 3D detailed anatomical images, which is used for disease detection, diagnosis, and treatment monitoring. MRI is based on technology that excites and detects the change in the direction of the rotational axis of protons found in the water that makes up living tissues.

As used herein, the term "diagnosis" refers to a process of identifying a disease, condition, or injury from its signs and symptoms. A health history, physical examination, and tests, such as blood tests, imaging, scanning, and biopsies can be used to help make a diagnosis.

As used herein, the term "dose" refers to the dose activity of a radionuclide required to perform imaging on a subject. The dose of a radionuclide to be administered to the subject ranges from about 0.01 MBq to 10,000 MBq.

As used herein, the term "radionuclide" or "radioisotope" refers to an unstable form of a chemical element that releases radiation as it breaks down and becomes more stable. Radionuclides can occur in nature and/or can be generated in a laboratory.

As used herein, the term "generator" or "radioisotope generator" refers to a hollow column inside a radioactivity-shielding container. The column is filled with an ion exchange resin and a radioisotope is loaded onto the resin. Preferably, the radionuclide generator according to the present invention is $^{99}Mo/^{99m}Tc$. The radioisotope generator as per the present invention comprises multiple tubing, one or more valves, one or more vessels to collect the eluate and/or waste, saline, and one or more ports to introduce saline solution and/or evacuate the eluate.

As used herein, the term "eluant" refers to the liquid or the fluid used for selectively leaching out the daughter radioisotopes from the generator column. The terms eluant and eluent may be used interchangeably herein.

As used herein, the term "eluate" refers to the radioactive eluant after the acquisition of the daughter radioisotope from the generator column.

As used herein, the term "breakthrough" refers to the undesired elution of the parent radioisotope in the eluate when the elution process occurs due to chemical and radiological decomposition or mechanical disruption of the stationary phase.

An embodiment of the present invention provides a method of diagnosing different diseases or disorders in a subject comprising performing one or more CT scans, SPECT scans, MRI scans, or any combination thereof by administering one or more SPECT agents, contrast agents, and dyes or any combination thereof.

An embodiment of the present invention provides imaging protocols for diagnosing diseases or disorders in a subject.

In an embodiment, the radionuclide or radioisotope is a SPECT agent. The SPECT agent can be radiolabeled with one or more ligands. In another embodiment, the SPECT agent can be administered without radiolabeling.

In another embodiment, the radionuclide or radioisotope is attached to the ligand before administration into the subject. The ligands are provided in a suitable dosage form and a radionuclide or radioisotope is attached to the ligand and then administered to the subject for imaging. The ligands according to the present invention are selected from the group consisting of Tetrofosmin, Sestamibi, Fluorodeoxyglucose, or any combinations thereof. In an embodiment, SPECT agents are selected from the group consisting of $^{99m}Tc$, $^{123}I$, $^{131}I$, $^{111}In$, $^{155}Tb$, $^{201}Tl$ and $^{133}Xe$.

In another embodiment, the present invention provides a three-port design having a surface that comprises an evacuation port, a loading port, and a saline flush port.

In another embodiment, the evacuation port is used for evacuating the generated radionuclide.

In another embodiment, the loading port is used for re-loading the parent radionuclide into the generator column.

In another embodiment, the saline flush port is used for providing the eluent.

In another embodiment, the present invention provides a three-port design having a surface that comprises an evacuation port, a loading port, and a saline flush port; wherein, the saline flush port is permanently connected with the loading port so that where the rinsing solution can be placed on the saline port and pass it through the Mo-99 vial to recover almost 100% of the activity intended for loading. The inventors of the present invention unexpectedly found that this phenomenon provides a robust design of the three-port radioisotope generator, which is cost-effective, minimizes the wastage of the Mo-99, and also provides safety from needle contamination.

An embodiment of the present invention provides a radioisotope generator system comprising:

a) a shielded reactor housing having a surface;

b) a radioisotope generator column; and c) an adapter disk disposed on said shielded reactor housing.

In another embodiment, the surface comprises an evacuation port, a loading port, and a saline flush port.

In another embodiment, the inlet port is connected with the evacuation port.

In another embodiment, the outlet port is connected with the loading port.

In another embodiment, the evacuation port is used to evacuate the daughter radioisotope.

In another embodiment, the saline flush port is used to provide the eluent and the loading port is used to re-load the parent radioisotope into the generator column.

An embodiment of the present invention provides a radioisotope generator system comprising:

a) a shielded reactor housing having a surface comprising an evacuation port, a loading port, and a saline flush port;

b) a radioisotope generator column located within the shielded reactor housing and comprising an inlet and outlet port; and c) an adapter disk disposed on said shielded reactor housing and comprises a ridge of material that extends around the said evacuation port; a ridge of material that extends around said loading port; and a ridge of material that extends around said saline flush port;

wherein the inlet port is connected with the evacuation port; the outlet port is connected with the loading port; the evacuation port is used to evacuate the daughter radioisotope; the saline flush port is used to provide the eluent and the loading port is used to re-load the parent radioisotope into the generator column.

An embodiment of the present invention provides a radioisotope generator system comprising:

a) a shielded reactor housing having a surface comprising an evacuation port, a loading port, and a saline flush port;

b) a radioisotope generator column located within the shielded reactor housing and comprising an inlet and outlet port; and c) an adapter disk disposed on said shielded reactor housing comprises a ridge of material that extends around the said evacuation port; a ridge of material that extends around said loading port; and a ridge of material that extends around said saline flush port;

wherein the inlet port is connected with the evacuation port; the outlet port is connected with the loading port; the evacuation port is used to evacuate the daughter radioisotope; the saline flush port is used to provide the eluent and the loading port is used to re-load the parent radioisotope into the generator column. In another embodiment, the radioisotope generator system further comprises a controller to control the activity of the said radioisotope generator and a detector to detect the radioactive purity and communicable to the said controller.

An embodiment of the present invention provides a radioisotope generator system comprising:

a) a shielded reactor housing having a surface comprising an evacuation port, a loading port, and a saline flush port;
b) a radioisotope generator column located within the shielded reactor housing and comprising an inlet and outlet port; and
c) an adapter disk disposed on said shielded reactor housing comprises a ridge of material that extends around the said evacuation port; a ridge of material that extends around said loading port; and a ridge of material that extends around said saline flush port;

wherein the inlet port is connected with the evacuation port; the outlet port is connected with the loading port; the evacuation port is used to evacuate the daughter radioisotope; the saline flush port is used to provide the eluent; the loading port is used to re-load the parent radioisotope into the generator column and the saline flush port is permanently connected with the loading port.

An embodiment of the present invention provides a radioisotope generator system comprising:

a) a shielded reactor housing having a surface comprising an evacuation port, a loading port, and a saline flush port;
b) a radioisotope generator column located within the shielded reactor housing and comprising an inlet and outlet port; and
c) an adapter disk disposed on said shielded reactor housing comprises a ridge of material that extends around the said evacuation port; a ridge of material that extends around said loading port; and a ridge of material that extends around said saline flush port;

wherein the inlet port is connected with the evacuation port; the outlet port is connected with the loading port; the evacuation port is used to evacuate the daughter radioisotope; the saline flush port is used to provide the eluent; the loading port is used to re-load the parent radioisotope into the generator column and the saline flush port is permanently connected with the loading port.

An embodiment of the present invention provides a radioisotope generator system, wherein said radioactive shielding material is selected from the group consisting of lead, stainless steel, tungsten, depleted uranium, or any combinations thereof.

An embodiment of the present invention provides a radioisotope generator system, wherein said radioactive shielding material is tungsten and/or stainless steel.

An embodiment of the present invention provides a radioisotope generator system, wherein the generator column is made of materials selected from the group consisting of plastic, glass, stainless steel, titanium, tin, nickel, cadmium, tungsten, copper, aluminum, or any combination thereof.

An embodiment of the present invention includes a radioisotope generator system, wherein the radioisotope generator is a $^{99}$Mo/$^{99m}$Tc generator.

An embodiment of the present invention provides a radioisotope generator system, wherein said generator housing is substantially cylindrical.

In another embodiment of the present invention, the radioisotope generator system as per the present invention further comprises one or more valves, tubing for fluid flow, and a controller to control the said radioisotope generator.

An embodiment of the present invention provides a radioisotope generator system, wherein said generator housing includes a first end, a second end, and a wall extending between the first end and the second end.

An embodiment of the present invention provides a radioisotope generator system, wherein the said first end holds an evacuation port, a loading port, and a saline flush port in a fixed position.

An embodiment of the present invention provides a radioisotope generator system, wherein the parent radioisotope is Mo-99.

An embodiment of the present invention provides a radioisotope generator system, wherein the daughter radioisotope is Tc-99m.

An embodiment of the present invention provides a radioisotope generator system, wherein the generator column is made of a material selected from the group consisting of glass, plastic, stainless steel, titanium, tin, nickel, cadmium, tungsten, copper, aluminum, or any combination thereof.

An embodiment of the present invention provides a radioisotope generator system, wherein the saline flush port is permanently connected with the said loading port to place a rinsing solution on the saline port and pass it through the Mo-99 vial to recover almost 100% of the activity intended for loading.

An embodiment of the present invention provides a radioisotope generator system, wherein the generator column is made up of glass and/or plastic and contains an aluminium oxide matrix support.

An embodiment of the present invention provides a radioisotope generator system, wherein the generator column is made of materials selected from the group consisting of plastic, glass, stainless steel, titanium, tin, nickel, cadmium, tungsten, copper, aluminum, or any combination thereof and contains an aluminium oxide matrix support.

An embodiment of the present invention provides a radioisotope generator system, wherein the generator column is configured to be reloaded with the parent radioisotope solution more than six times.

An embodiment of the present invention provides a radioisotope generator system, wherein the saline vessel comprises Normal Saline [0.9%] solution.

An embodiment of the present invention provides a radioisotope generator system, wherein the saline flush port is temporarily connected with the loading port.

An embodiment of the present invention provides a radioisotope generator system, wherein the saline flush port is permanently connected with the loading port.

In an embodiment, the third port allows the transfer of almost 100% of the Mo-99 solution to be loaded into the column and eliminates regulatory and radiation safety concerns regarding a Mo-99-contaminated saline entry port.

In an embodiment, the dose of a radionuclide to be administered to the subject ranges from about 0.01 MBq to 10,000 MBq.

In an embodiment according to the present invention, the radioisotope generator system maintains the system functionality as per the manufacturer's specification throughout the process.

FIG. 1 depicts the diagram of 99Mo/99mTc radioisotope generator system (100) of the present disclosure wherein generator column (15) is connected with the entry pipe (17) and exit pipe (16). The entry pipe (17) is connected with the needle adapter (10) to connect the entry needle (5) of Mo stock vessel (5) which is a loading port and disposed on the adapter plate (18). The exit pipe (16) is connected with the needle adapter (9) to connect the sterile needle (6) of the collection vessel (1) which is an evacuation port. Furthermore, saline vessel (3) with entry needle (4) which is a saline flush port and connected permanently with the loading port through the tubing line in connection with check valve (14) and needle adapters (12, 13) to needle (7). The vent needle (8) is connected with the safety valve (11) for protecting said vent filter by preventing back pressure from being released onto said vent filter.

Figure 2:
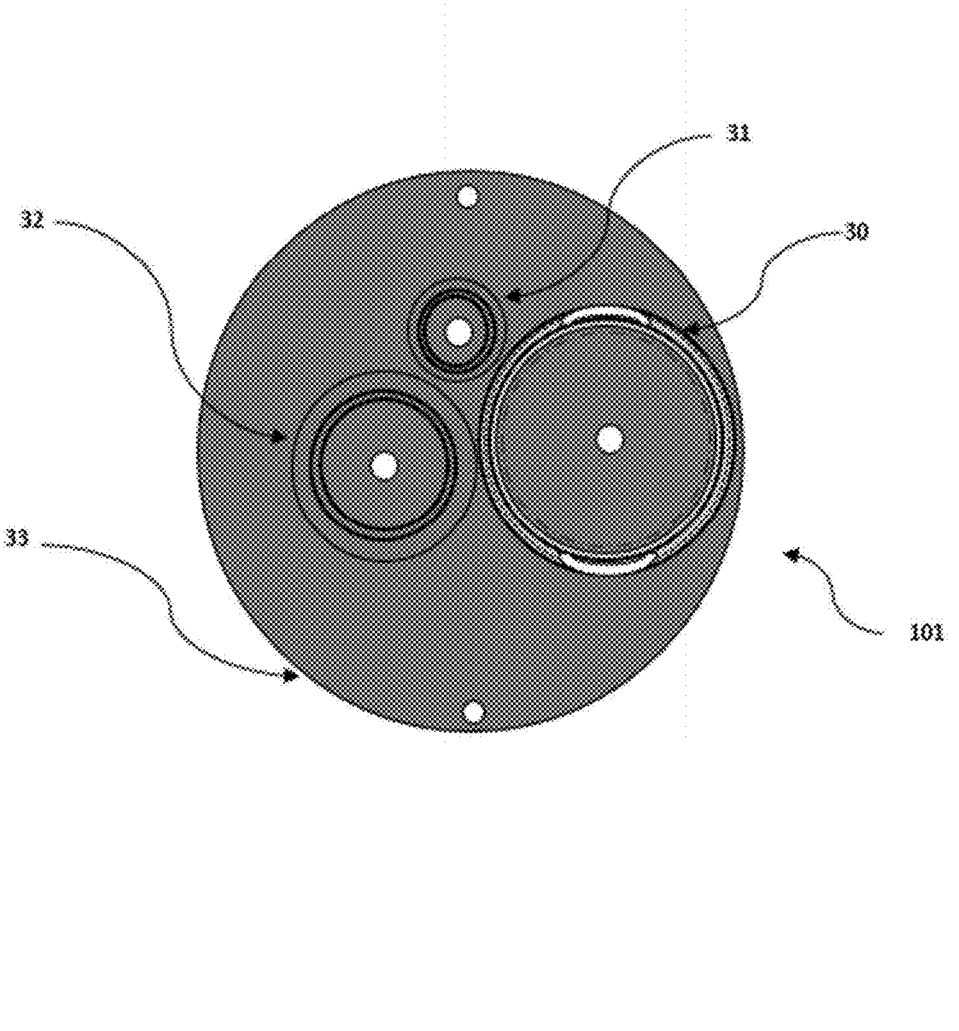
FIG. 2 Depicts the diagram of the top view of the lid of $^{99}Mo/^{99m}Tc$ radioisotope generator, which comprises three-ports.

FIG. 2 Depicts the diagram of the top view of the of 99Mo/99mTc radioisotope generator system surface 101, which consists of three-ports. An adapter disk (33) disposed on said shielded reactor housing comprising a ridge of material that extends around the said evacuation port (32); a ridge of material that extends around said loading port (30); and a ridge of material that extends around said saline flush port (31).

Figure 3:
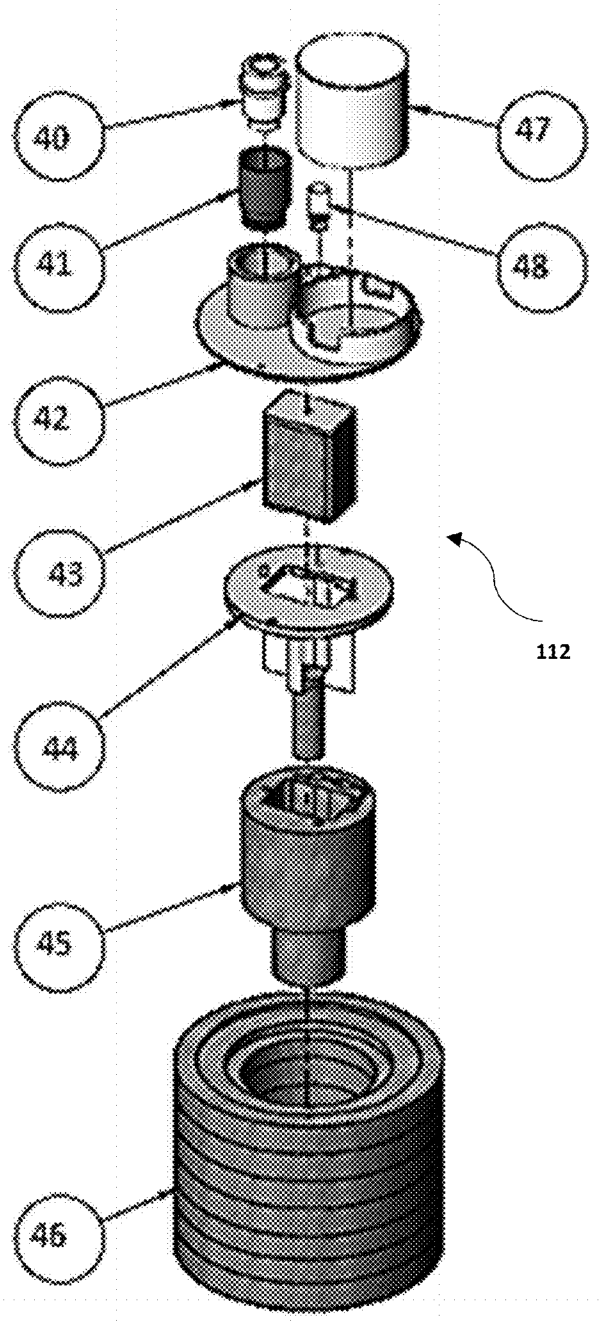
FIG. 3 Depicts the diagram of the internal arrangement of the $^{99}Mo/^{99m}Tc$ radioisotope generator column.

FIG. 3 depicts the diagram of the internal arrangement of the $^{99}$Mo/$^{99m}$Tc radioisotope generator column. Wherein the lead ring shield assembly (46) enclosed the lead base (45) which shields the generator column (15). The top plate assembly (44) encircled the lead shielded plug assembly (43), over the top of this there is an adapter disk (42) with three ports that are Mo stock assembly (47), saline flush port assembly (48) and evacuation port assembly with moly-fill filter holder assembly connected with elution port assembly.

The invention also includes a process or method of using the radioisotope generator column according to the steps described herein.

What is claimed:

1. A radioisotope generator system comprising:

a) a shielded reactor housing having a surface comprising an evacuation port, a loading port, and a saline flush port;

b) a radioisotope generator column located within the shielded reactor housing and comprising an inlet and outlet port; and c) an adapter disk disposed on said shielded reactor housing comprises a ridge of material that extends around the said evacuation port, a ridge of material that extends around said loading port, and a ridge of material that extends around said saline flush port;

wherein the inlet port is connected with the evacuation port, the outlet port is connected with the loading port, the evacuation port is used to evacuate the daughter radioisotope, the saline flush port is used to provide the eluent and the loading port is used to re-load the parent radioisotope into the generator column.

2. The radioisotope generator system of claim 1, wherein said radioactive shielding material is selected from the group consisting of lead, stainless steel, tungsten, depleted uranium, or combinations thereof.

3. The radioisotope generator system of claim 1, wherein said radioactivity shielding material is tungsten or stainless steel.

4. The radioisotope generator system of claim 1, wherein said generator column and/or said shielded reactor housing is substantially cylindrical.

5. The radioisotope generator system of claim 1, wherein said generator column and/or said shielded reactor housing includes a first end, a second end, and a wall extending between the first end and the second end.

6. The radioisotope generator system of claim 5, wherein the first end holds an evacuation port, a loading port, and a saline flush port in a fixed position.

7. The radioisotope generator system of claim 1, wherein the parent radioisotope is Mo-99.

8. The radioisotope generator system of claim 1, wherein the daughter radioisotope is Tc-99m.

9. The radioisotope generator system of claim 1, wherein the generator column is made of materials selected from the group consisting of plastic, glass, stainless steel, titanium, tin, nickel, cadmium, tungsten, copper, aluminum, or any combination thereof.

10. The radioisotope generator system of claim 1, wherein the said radioisotope generator system further comprises one or more valves, tubing for fluid flow, and a controller to control the said radioisotope generator.

11. The radioisotope generator system of claim 1, wherein the saline flush port is permanently connected with the said loading port to place a rinsing solution on the saline port and pass it through the Mo-99 vial to recover almost 100% of the activity intended for loading.

12. The radioisotope generator system of claim 9, wherein the generator column contains an aluminium oxide matrix support.

13. The radioisotope generator system of claim 1, wherein the generator column is configured to be reloaded with parent radioisotope solution more than six times.

14. The radioisotope generator system of claim 1, wherein the system further comprises one or more saline vessels comprising Normal Saline [0.9%] solution.

15. A radioisotope generator system comprising:

a) a shielded reactor housing having a surface comprising an evacuation port, a loading port, and a saline flush port;

b) a radioisotope generator column located within the shielded reactor housing and comprising an inlet and outlet port; and c) an adapter disk disposed on said shielded reactor housing comprises a ridge of material that extends around the said evacuation port, a ridge of material that extends around said loading port, and a ridge of material that extends around said saline flush port;

wherein the inlet port is connected with the evacuation port, the outlet port is connected with the loading port, the evacuation port is used to evacuate the daughter radioisotope, the saline flush port is used to provide the eluent, the loading port is used to re-load the parent radioisotope into the generator column and the saline flush port is permanently connected with the loading port.

16. The radioisotope generator system of claim 15, wherein the saline flush port is permanently connected with the said loading port to place a rinsing solution on the saline port and pass it through the Mo-99 vial to recover almost 100% of the activity intended for loading.

17. The radioisotope generator system of claim 15, wherein the generator column is configured to be reloaded with parent radioisotope solution more than six times.

18. The radioisotope generator system of claim 15, wherein the generator column is made of materials selected from the group consisting of plastic, glass, stainless steel, titanium, tin, nickel, cadmium, tungsten, copper, aluminum, or any combination thereof and contains an aluminium oxide matrix support.

* * * * *